(12) United States Patent
Reznar et al.

(10) Patent No.: US 10,745,182 B1
(45) Date of Patent: Aug. 18, 2020

(54) RELEASABLE TIE-STRAP FASTENER

(71) Applicant: A. Raymond et Cie, Grenoble (FR)

(72) Inventors: Jason Reznar, Birmingham, MI (US); William Gregory Teller, Lake Orion, MI (US)

(73) Assignee: A. Raymond et Cie, Grenoble (FR)

( * ) Notice: Subject to any disclaimer, the term of this patent is extended or adjusted under 35 U.S.C. 154(b) by 0 days.

(21) Appl. No.: 16/422,137

(22) Filed: May 24, 2019

(51) Int. Cl.
  *B65D 63/10* (2006.01)
  *F16L 3/237* (2006.01)
  *F16L 3/137* (2006.01)

(52) U.S. Cl.
  CPC .......... *B65D 63/1072* (2013.01); *F16L 3/137* (2013.01); *F16L 3/237* (2013.01); *B65D 2563/107* (2013.01)

(58) Field of Classification Search
  CPC ........... B65D 63/1072; B65D 2563/107; F16L 3/1367; F16L 3/237
  See application file for complete search history.

(56) References Cited

U.S. PATENT DOCUMENTS

| | | | |
|---|---|---|---|
| 3,875,618 A | 4/1975 | Schuplin | |
| 4,993,669 A * | 2/1991 | Dyer | B65D 63/16 24/16 PB |
| 5,102,075 A * | 4/1992 | Dyer | B65D 63/16 24/16 PB |
| 5,794,461 A * | 8/1998 | Smith | B65D 63/1072 292/318 |
| 5,966,781 A | 10/1999 | Geiger | |
| 6,240,602 B1 | 6/2001 | Geiger | |
| 6,364,257 B1 | 4/2002 | Holder | |
| 6,446,474 B1 * | 9/2002 | Tabacchi | B65D 63/1027 128/869 |
| 6,532,631 B2 * | 3/2003 | Rohaly | B65D 63/16 24/16 PB |
| 6,533,226 B2 | 3/2003 | Geiger | |
| 7,328,487 B2 * | 2/2008 | Hoffman | B65D 63/14 24/16 PB |
| 7,437,804 B1 | 10/2008 | Geiger et al. | |
| 9,328,539 B1 * | 5/2016 | Lonardo | E05B 75/00 |
| 9,958,089 B2 | 5/2018 | Geiger et al. | |
| 10,001,226 B2 * | 6/2018 | Haynes | F16B 2/08 |
| 2002/0104196 A1 | 8/2002 | Geiger | |
| 2013/0205545 A1 * | 8/2013 | Zantout | B65D 63/00 24/16 R |

(Continued)

*Primary Examiner* — Robert Sandy
*Assistant Examiner* — David M Upchurch
(74) *Attorney, Agent, or Firm* — Warner Norcross + Judd LLP

(57) ABSTRACT

This disclosure provides an improved tie-strap fastener (the "releasable fastener") for releasably securing elongate articles to a panel. The releasable fastener includes a body defining a laterally spaced curved aperture, an elongated strap projecting laterally outward from a lateral side of the body between a top surface and the aperture, and a locking pawl disposed the aperture. The body defines an opening extending internally from a side surface of the body to the aperture to provide access to the locking pawl, which is adapted to releasably engage and retain the elongated strap when inserted into the aperture from the top surface of the body. Methods of installing the releasable fastener on a panel, releasably fastening elongate articles to the panel with the releasable fastener, and related assemblies are also provided.

15 Claims, 4 Drawing Sheets

(56) References Cited

U.S. PATENT DOCUMENTS

| | | | |
|---|---|---|---|
| 2016/0091122 A1* | 3/2016 | Geiger | F16L 3/137 248/61 |
| 2018/0282037 A1* | 10/2018 | Zant | B32B 27/288 |
| 2019/0031413 A1* | 1/2019 | Tschida | B65D 63/1036 |

* cited by examiner

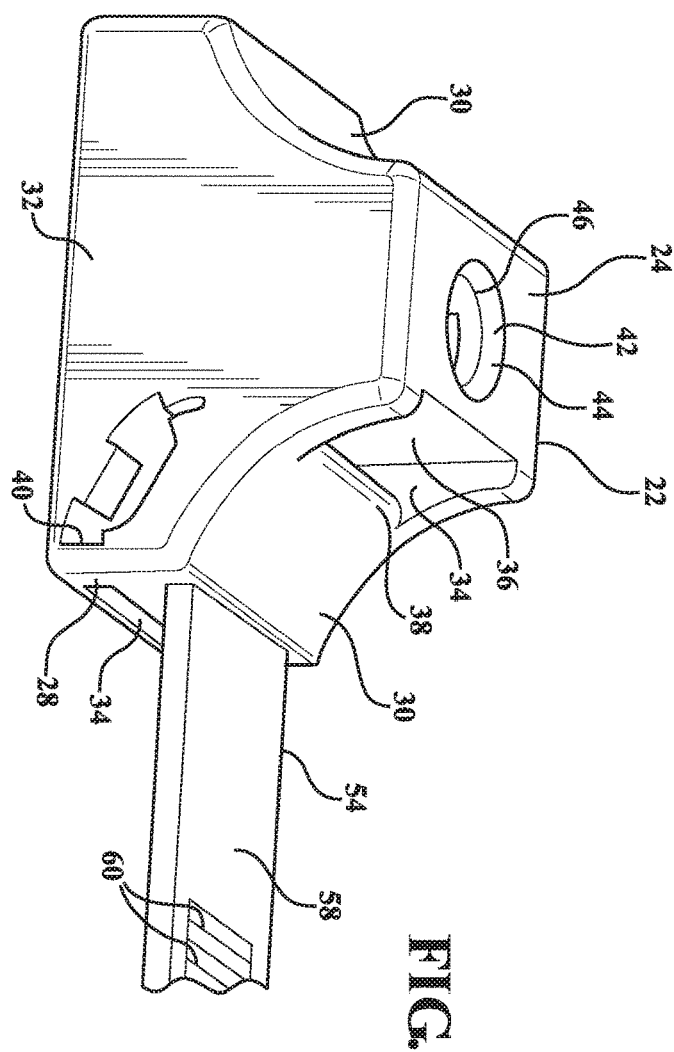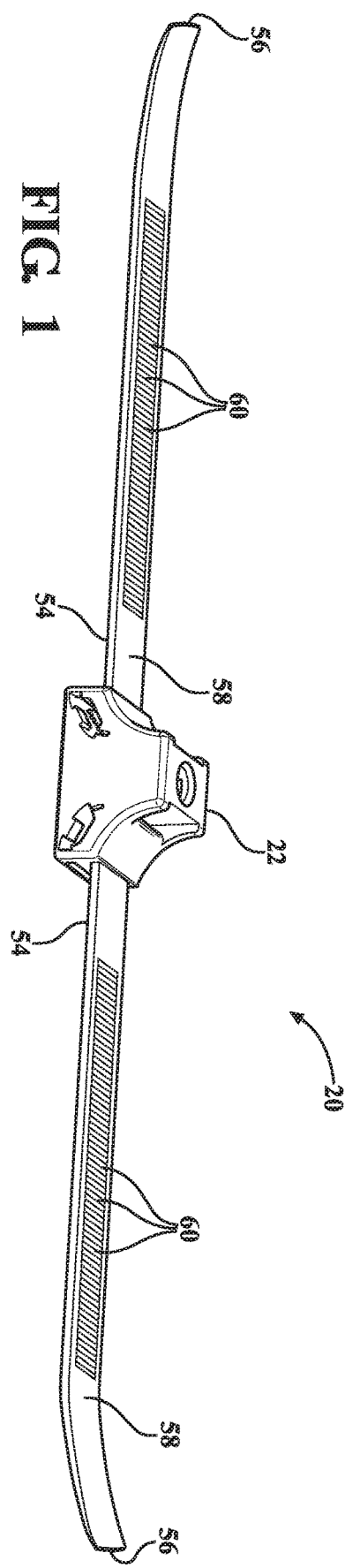

US 10,745,182 B1

RELEASABLE TIE-STRAP FASTENER

FIELD OF THE INVENTION

The present disclosure generally relates to fasteners for coupling elongate articles to a component and, more specifically, to a releasable tie-strap fastener and related methods and assemblies.

BACKGROUND OF THE INVENTION

Fasteners are used in various industries to secure components to panels and other structures. In the automotive industry, for example, tie-strap fasteners (e.g. clamp ties, lashing ties, etc.) may be used to secure wires or cables to a vehicle frame.

Unfortunately, however, many conventional tie-strap fasteners are not adequate for securing multiple components to a single panel or structure. Moreover, multi-component fasteners designed to overcome such challenges frequently present uniquely related problems such as chaffing and excessive heat transfer (among others), due to the proximity of the components being secured, loosening of the fastener over time, etc. Attempts to mitigate such problems have resulted in modern single-use tie-strap fasteners that are difficult to install, expensive to manufacture, and unsuitable for applications where maintenance, adjustment, and/or replacement of assembly components is frequently required.

SUMMARY OF THE INVENTION

An improved tie-strap fastener is provided. The tie-strap fastener is releasable, and includes a body defining an aperture extending along an inwardly curved path from a lateral side of the body to a top surface of the body. The tie-strap fastener also includes an elongated strap that projects laterally outward from the lateral side of the body between the top surface of the body and the aperture. The elongated strap is adapted to be inserted into the aperture from the top surface of the body. The tie-strap fastener also includes a locking pawls disposed in the aperture of the body. The locking pawl is adapted for releasably engaging and retaining the elongated strap when the elongated strap is inserted into the aperture from the top surface of the body. The tie-strap fastener also includes an opening defined by the body. The opening extends internally from a side surface of the body to the aperture defined thereby, such that the locking pawl is pivotably accessible from the side surface of the body via the opening.

In some embodiments, the tie-strap fastener is a double tie-strap fastener. The double tie-strap fastener includes the body, a pair of laterally spaced apertures defined by the body, a pair of elongated straps, and a pair of locking pawls. Each of the apertures extends along an inwardly curved path from opposing lateral sides of the body to the top surface of the body. The elongated straps each project laterally outward from the opposing lateral sides of the body between the top surface of the body and the apertures. Each of the elongated straps is adapted to be inserted into the aperture proximal the elongated strap from the top surface of the body. The locking pawls are each disposed in one of the apertures of the body and are adapted for releasably engaging and retaining the elongated straps when the elongated straps are inserted into the apertures from the top surface of the body. The double tie-strap fastener also includes openings defined by the body. The openings each extend internally from the side surface of the body to one of the apertures defined thereby, such that each locking pawl is pivotably accessible from the side surface of the body via the openings.

A method of installing the tie-strap fastener (i.e., the "installation method") is also provided. The installation method includes coupling the body of the tie-strap fastener to a component, thereby installing the tie-strap fastener on the component.

An assembly comprising the tie-strap fastener installed on a component is further provided.

A method of releasably fastening an elongate article to a component with the tie-strap fastener (i.e., the "fastening method") is also provided. The fastening method includes installing the tie-strap fastener on the panel in accordance with the installation method. The fastening method also includes releasably securing an elongate article to the tie-strap fastener, thereby releasably fastening the elongate article to the panel.

An assembly comprising the elongate article releasably secured to the tie-strap fastener installed on the panel is also provided. The assembly comprises an elongate article fastened to the panel via the tie-strap fastener.

These and other features and advantages of the present disclosure will become apparent from the following description of particular embodiments, when viewed in accordance with the accompanying drawings and appended claims.

DESCRIPTION OF THE DRAWINGS

FIG. 1 is a perspective view of a double tie-strap fastener in accordance with some embodiments of the disclosure;

FIG. 2 is a perspective view of a body of a tie-strap fastener in accordance with particular embodiments of the disclosure;

DETAILED DESCRIPTION OF THE INVENTION

Figure 3:
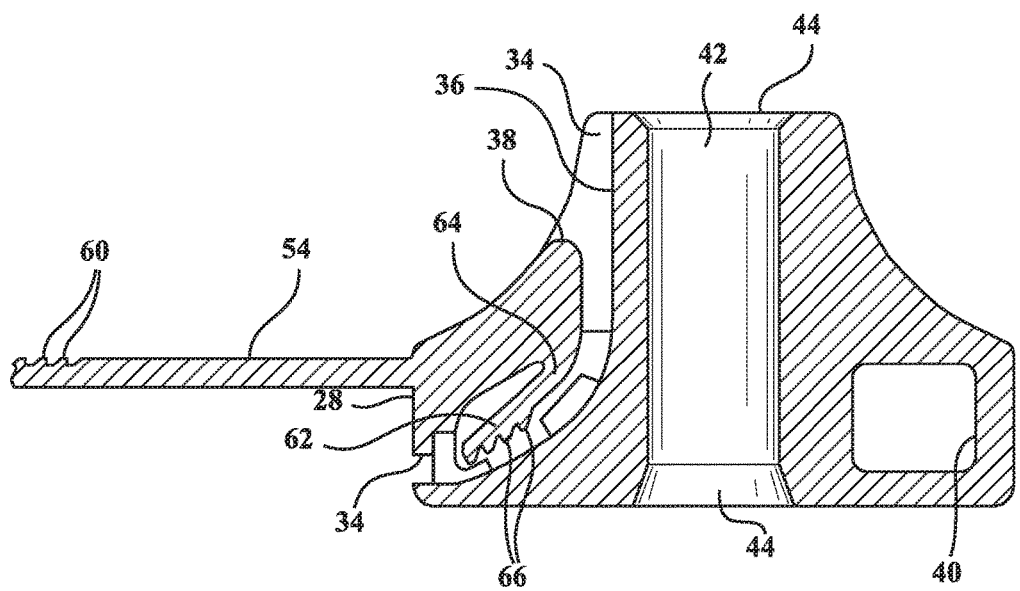
FIG. 3 is a cross-sectional view of the body of a tie-strap fastener in accordance with some embodiments of the disclosure.

An improved and releasable tie-strap fastener (the "releasable fastener") is provided. As described herein, the releasable fastener is adapted for releasably coupling elongate articles to a component (e.g. a panel, stud, etc.), such that the elongate articles can be released or adjusted with respect to the releasable fastener and the component, without first uninstalling the releasable fastener from the component. Moreover, the unique design of the releasable fastener allows for installation of the releasable fastener to the component prior to securing elongate articles thereto with the releasable fastener. Additionally, as will be appreciated in view of the description herein, the design and material construction of the releasable fastener provide increased usability and convenience, reduced maintenance and number of parts, and/or decreased need for paint or other surface treatments (e.g. those necessary to prevent corrosion).

Referring generally to the Figures, wherein like numerals indicate corresponding parts throughout the several views, the releasable fastener is illustrated and generally designated at 20. Certain features of the releasable fastener 20 are functional, but can be implemented in different aesthetic configurations.

As shown in FIGS. 1-2, the releasable fastener 20 includes a body 22. The body 22 is not limited with regards to shape, size, dimensions, etc. Rather, as will be understood by one of skill in the art, the body 22 may be any shape and/or size suitable for performing the functions of the body 22 described herein. In general, the body 22 comprises a top surface 24, a bottom surface 26 opposing the top surface 24, and opposing lateral sides 28 disposed between the top and bottom surfaces 24, 26. As described in further detail below, the bottom surface 26 is generally adapted to be disposed on a surface of a component, and thus may be smooth (e.g. to maximize surface-surface contact) or textured, or may comprise both smooth and textured portions. The lateral sides 28 may each comprise lateral side surfaces 30 which, as described further below, may be shaped to complement an elongate article intended to be disposed adjacent and/or secured to the releasable fastener 20. The body 22 also typically comprises side surfaces 32 extending between the lateral sides 28 perpendicular to the top and bottom surfaces 24, 26. It is to be understood that description of general, alternative, and/or optional features made in collective reference to like elements in the plural form may apply to one, both, or all of such like elements independently. For example, description of the lateral side surfaces 30 may independently refer to but one of the lateral side surfaces 30 or both of the lateral side surfaces 30, which are independently selected and configured in accordance with the description herein, as will be understood by those of skill in the art. Other elements and features of the releasable fastener 20 referred to in collective (i.e., plural) form will be likewise independently selected and configured in accordance with the description herein.

As introduced above, the lateral side surfaces 30 may be independently shaped to complement an elongate article intended to be disposed adjacent thereto. More specifically, in certain embodiments, the lateral side surfaces 30 are adapted to act as contact surfaces for elongate articles secured to the releasable fastener 20, as described in further detail below. For example, in certain embodiments, the lateral side surfaces 30 may independently present as concave side surfaces, which may be referred to as concave surfaces 30, adapted for contacting a convex portion of an elongate article (e.g. an outer/side surface of an elongate pipe, tube, etc.). Each of the concave surfaces 30 may be independently smooth (e.g. to maximize contact of the body 22 with an elongate article secured to the releasable fastener 20) or, alternatively, may comprise a raised portion (not shown), such as a support rail, to limit contact between the body 22 and an elongate article secured to the releasable fastener 20.

As will be understood from this disclosure, especially when viewed in accordance with the accompanying drawings, the releasable fastener 20 may be configured as a single tie-strap fastener (e.g. as exemplified by the embodiments shown in FIGS. 2, 3, and 6) or a double tie-strap fastener (e.g. as exemplified by the embodiments shown in FIGS. 1, 4, 5, and 7). As will be appreciated by those of skill in the art, the double tie-strap configuration comprises pairs of certain elements that are singularly present in the single tie-strap configuration. These certain elements directly correspond between the two configurations, such that description of one of such certain elements (e.g. when the releasable fastener 20 only comprises but one of these elements, such as in the single tie-strap configuration) equally applies to one or both of such elements in a pair (e.g. when the releasable fastener 20 comprises a pair (i.e., two) of these elements, such as in the double tie-strap configuration). For example, in general, the body 22 defines an apertures 34. However, in certain embodiments, the body 22 defines a pair of laterally spaced apertures 34 (e.g. when the releasable fastener 20 comprises the double tie-strap configuration). As such, reference to the apertures 34 may refer to but one, alternatively to one of a pair, alternatively to both apertures 34 defined by the body 22, depending on the particular configuration of the releasable fastener 20.

In general, each of the apertures 34 extends along an inwardly curved path from one of the lateral sides 30 to the top surface 24 of the body 22. As shown in FIG. 3, which depicts a cross-sectional view of the body 22, the apertures 34 are generally internally bounded by interior curved surfaces 36 of the body 22, the function of which is described in further detail below. In some embodiments, the body 22 comprises a feed lip 38 at an end of each aperture 34 proximal the top surface 24. For example, in certain embodiments the feed lips 28 compose a chamfered and/or rounded portion of the lateral sides 28, which provide a transition between each of the lateral side surfaces 30 and the interior of the corresponding apertures 34.

The body 22 also defines an opening 40, which extends internally from one of the side surfaces 32 of the body 22 to one of the apertures 34. In certain embodiments, the opening 40 extends through the body 22, e.g. between the side surfaces 32 of the body 22. The body 22 may comprise any number of the openings 40, which, in addition to particular functions described below, may be utilized to reduce material amounts and/or cost necessary to prepare the releasable fastener 20. For example, as shown in FIG. 3, the body 22 may define at least one of the openings 40 as a through hole, e.g. for reducing the material utilized to prepare the body, etc. In certain embodiments, the body 22 comprises at least a pair of openings 40, each extending internally to one of the apertures 34 (i.e., one opening 40 per aperture 34). In some embodiments, while not shown in the Figures, the body 22 also defines openings 40 that each extend internally from the bottom surfaces 26 of the body 22 to one of the apertures 34 (e.g. through a portion of the curved surface 36).

As introduced above, the releasable fastener 20 is adapted for releasably coupling elongate articles to a component, with the bottom surface 26 of the body 22 being generally adapted to be disposed on a surface of the component. In general, the body 22 is adapted to be coupled to the component, e.g. via a fastener, such as a panel fastener. For example, in certain embodiments, such as those generally exemplified by FIGS. 2 and 3, the body 22 defines a through hole 42 extending between the top and bottom surfaces 24, 26, e.g. between the apertures 34. In such embodiments, the through hole 42 is adapted to receive a fastener (e.g. a bolt, screw, push-type fastener, etc.), such as the bolt-type fastener 52 shown generally in FIG. 5. The through hole 42 is not generally limited, and may comprise any number of features, such as counter bored, rounded, and/or chamfered ends 44 for increasing ease of disposing (e.g. inserting, threading, etc.) the fastener 52 therein, threads or grooves 46 for retaining and/or aligning the fastener 52 therein, and/or smooth portions for increasing surface-surface contact between the body 22 and a portion of the fastener 52 and/or increasing ease of inserting the fastener 52 into and/or through the through hole 42. In particular embodiments, while not shown, the body 22 may define two, three, four, or more through holes 42, as will be readily appreciated by those of skill in the art.

Figure 7:
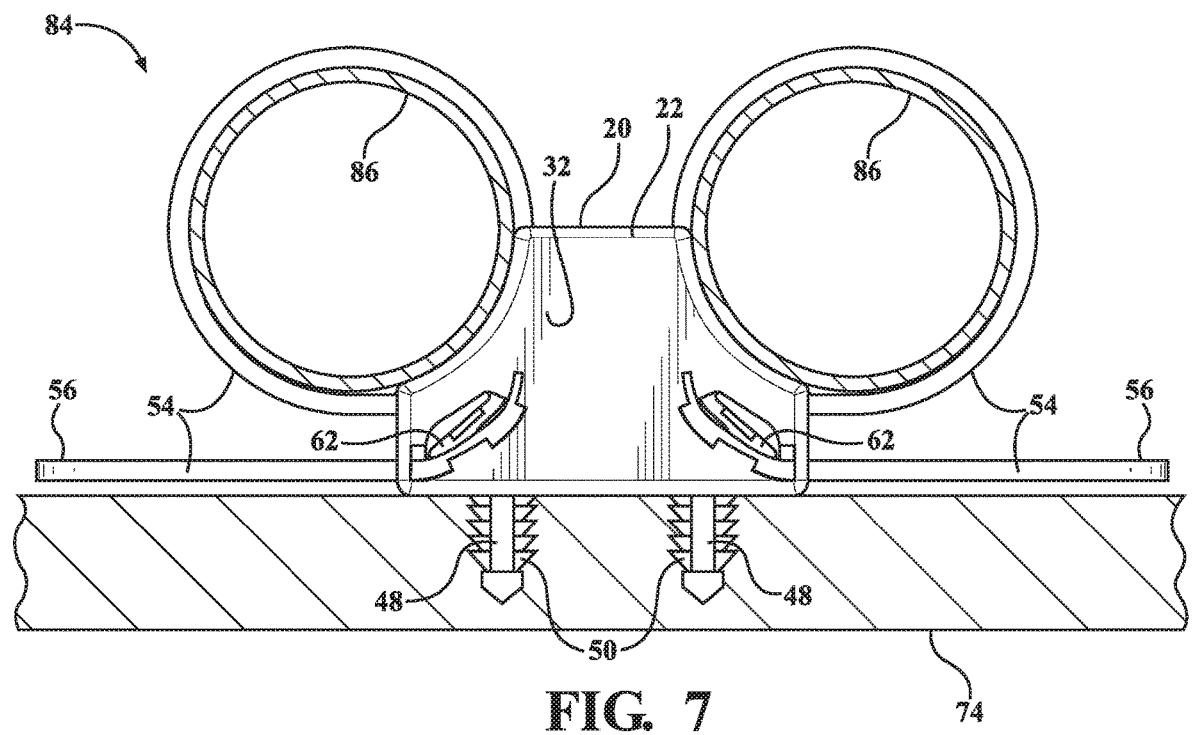
FIG. 7 is a side partial-cutaway view of an assembly including elongate articles secured to a double tie-strap fastener installed on a panel in accordance with one embodiment of the disclosure.

In certain embodiments, the body 22 is adapted to be to be coupled to the component without aid of an external fastener (e.g. the bolt-type fastener 52), and may instead itself comprise a fastening portion 48 (e.g. fixed to or integral with the body 22), as shown generally in FIG. 7. In such embodiments, the fastening portion 48 is adapted to be disposed and retained within a cavity of the component being coupled to the body 22, but is not otherwise limited. For example, the fastening portion may comprise a portion for screw-type fastening, push-type fastening, etc. In particular embodiments, the fastening portion 48 is a push-type fastener. In such embodiments, the fastening portion 48 typically comprises resiliently compressible elements 50 adapted for retaining the fastening portion 48 within the cavity of the component once disposed therein (e.g. by a ridge or retaining element of the component (not shown)).

In addition to the body 22, the releasable fastener 20 comprises an elongated strap 54, or a pair of elongated straps 54. As shown in FIGS. 1-4, the elongated straps 54 project laterally outward from the lateral sides 28 of the body 22 to terminal ends 56. Typically, the elongated straps 54 project from a portion of the lateral sides 28 of the body 22 between the top surface 24 and lateral-most portions of the apertures 34 (i.e., where the apertures 34 are defined by the lateral sides 30 of the body 22).

In general, the terminal end 56 of each elongated strap 54 is adapted to be inserted into and through the aperture 34 proximal the elongated strap 54, from the top surface of the body 22 and out the lateral sides 28 of the body 22. As such, as will be appreciated by those of skill in the art, the elongated straps 54 are flexible and resilient such that each of the elongated straps 54 is deformable into a "looped configuration", as shown generally in FIG. 4, where the elongated straps 54 are curved/looped internally toward the body 22 and partially disposed within the apertures 34, and the terminal ends 56 of the elongated straps 54 protrude laterally outward from the apertures 34 beyond the lateral sides 28 of the body 22. Moreover, the apertures 34 typically cooperate with/guide the elongated straps 54. For example, the elongated straps 54 typically comprise a resilient flexibility suitable to allow the elongated straps 54 to conform to the curved path of the apertures 34 (e.g. formed by at least the interior curved surfaces 36) without failure or breakage in the looped configuration. In certain embodiments, the apertures 34 deform the elongated straps 54 in the looped configuration to guide the terminal ends 56 outwardly from the lateral sides 28 of the body 22 (i.e., protrude laterally outward from the apertures 34) in a direction generally parallel to bottom surface 26 of the body 22.

Figure 4:
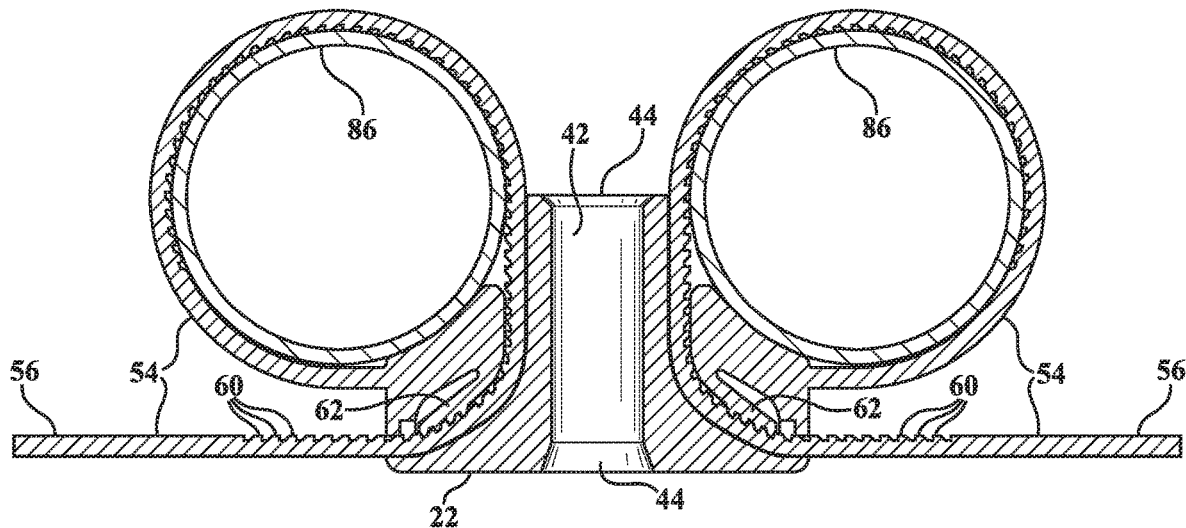
FIG. 4 is a cross-sectional view of a double tie-strap fastener securing elongate articles in accordance with certain embodiments of the disclosure.
Figure 5:
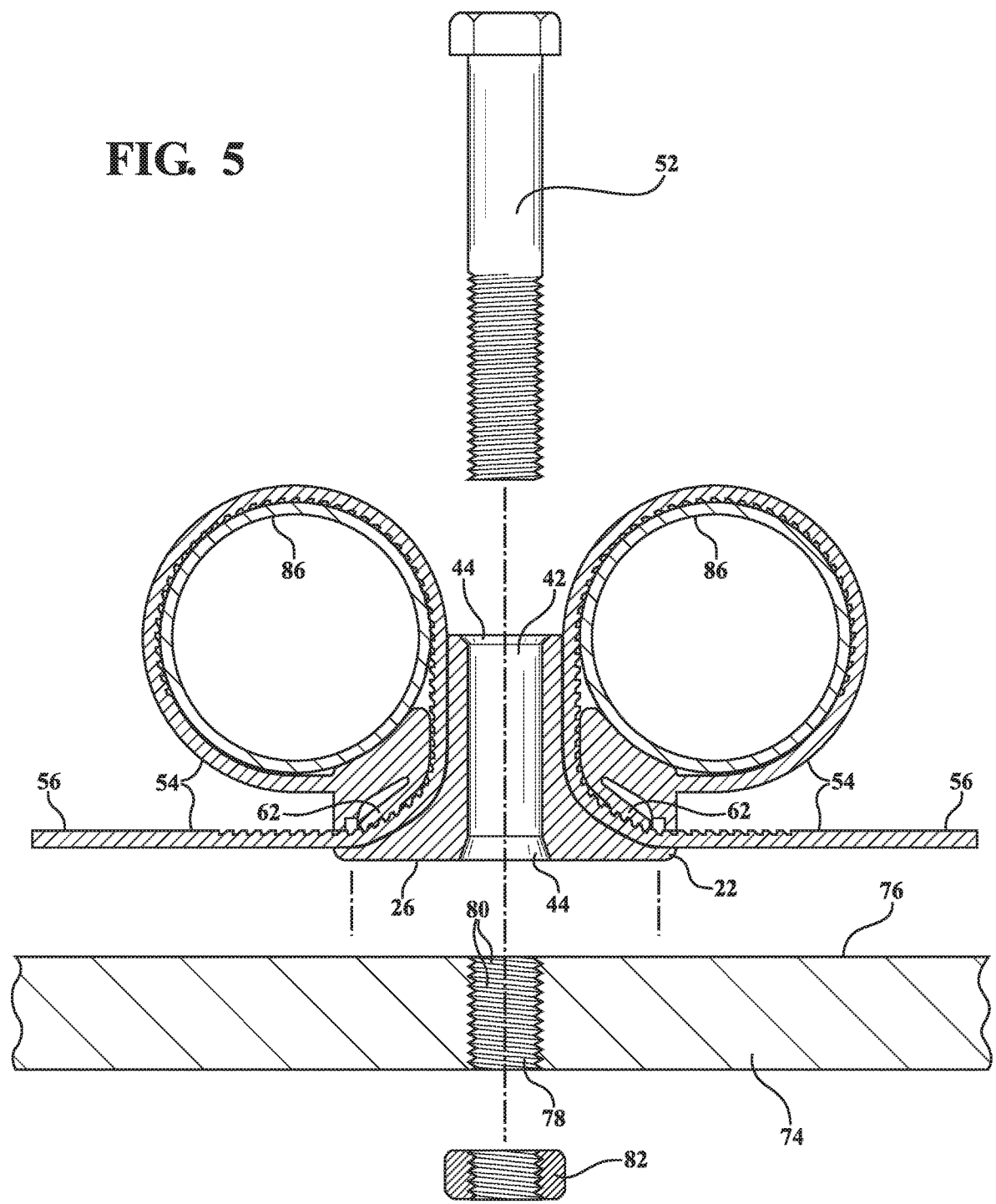
FIG. 5 is an exploded cross-sectional view of a double tie-strap fastener releasably fastening elongate articles to a component in accordance with some embodiments of the disclosure.

Typically, each of the elongated straps 54 comprises a first surface 58, which is generally coplanar with the top surface 24 of the body 22 when the elongated strap 54 is extended away from the body 22 (e.g. as shown in FIG. 1), and is generally interior-facing when the elongated strap 54 is in the looped configuration (e.g. as shown in FIG. 4). In certain embodiments, the first surface 58 comprises teeth or serrations 60. However, the elongated straps 54 may comprise holes, divots, or projections (not shown) in place of, or in addition to, the serrations 60. Suitable configurations and alternatives to these particular features of the elongated straps 54 will be understood in view of the additional details described further below.

As will be appreciated by those of skill in the art in view of the embodiments described herein, the elongated straps 54 and the apertures 34 are selected to comprise complementary dimensions (i.e., length, thickness, width) in proportion to each other, such that the elongated straps 54 may be inserted into and through the apertures 34 without excessive force and/or damaging either component (e.g. where the apertures 34 are undersized and/or the elongated straps 54 are oversized), and without excessive slop/play between the components after such an insertion (e.g. where the apertures 34 are oversized and/or the elongated straps 54 are undersized). Additionally, the terminal ends 56 of the elongated straps 54 may comprise a tapered shape and/or other features (e.g. narrowed, rounded, and/or beveled edges, etc.) for increasing the ease of insertion into the apertures 34.

Figure 6:
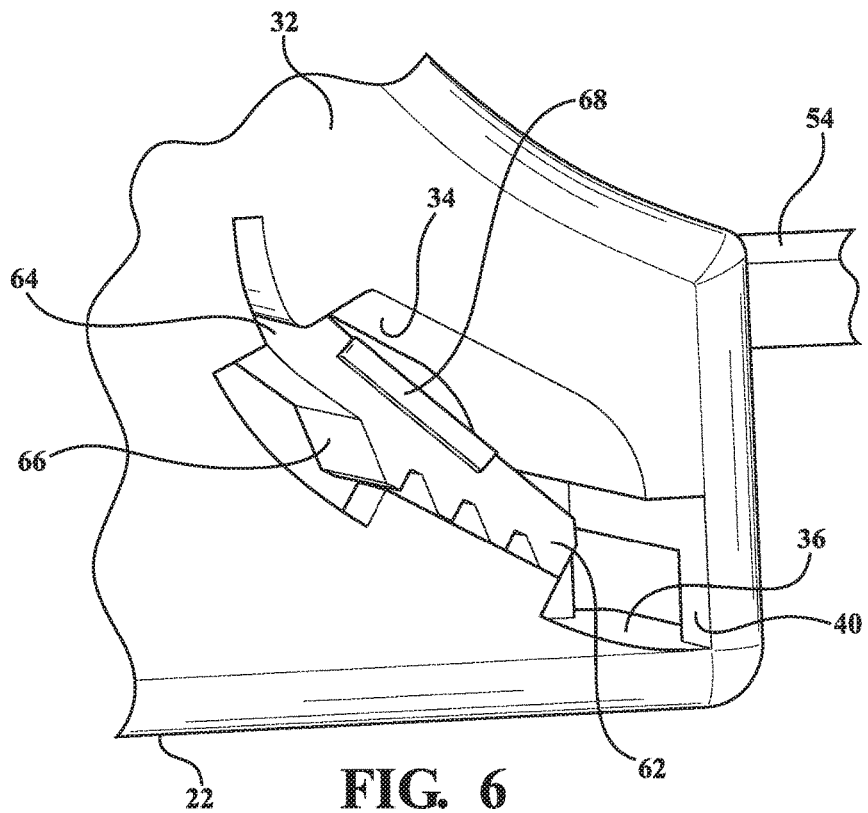
FIG. 6 is a perspective view of a locking pawl in an aperture of the body of a tie-strap fastener in accordance with certain embodiments of the disclosure.

The tie-strap fastener also includes a locking pawl 62, or a pair of locking pawls 62, with each locking pawl 62 being disposed in one of the apertures 34 of the body 22 (i.e., one locking pawl 62 per aperture 34). Typically, as shown in FIG. 6, each of the locking pawls 62 extends from an attached end 64 into the aperture 34 and toward the curved surface 36. In general, the locking pawls 62 are adapted for releasably engaging and retaining the elongated straps 54 (e.g. via frictional and/or mechanical engagement) when the elongated straps 54 are disposed in the apertures 34. In this fashion, the elongated strap 54, the body 22, and the locking pawls 62 cooperatively function as a tie-strap assembly, as will be understood by those of skill in the art. Likewise, the configuration of the pair of elongate straps 54, apertures 34, and locking pawls 62 cooperatively function as a double (or dual) tie-strap assembly.

Typically, each of the locking pawls 62 comprises teeth 66, or other such projections, which are adapted to engage the serrations 60 of the elongated straps 54 to impede movement of the elongated straps 54 in one direction within/along the apertures 34. In particular, the locking pawls 62 are adapted to permit insertion of the elongated straps 54 into the apertures 34 from the top surface 24 of the body 22, but inhibit movement of the elongated straps 54 in a direction of removal (i.e., inward movement along the curved path of the apertures 34 from the lateral sides 28 to the top surface 24 of the body 22). Moreover, while the locking pawls 62 are selectively adapted for engaging and retaining the elongated straps 54 when inserted into the apertures 34 from the top surface 24 of the body 22, the locking pawls 62 are adapted to not engage or retain the elongated straps 54 when inserted into the apertures 34 from the lateral sides 28 of the body 22.

As will be appreciated from the description of the embodiments herein, each of the locking pawls 62 is typically pivotably coupled to the body 22 at the attached end 64. In certain embodiments, the attached end 64 comprises a hinge, such as a living hinge. While not shown, in these or other embodiments, the locking pawl 62 is biased toward the curved surface 36 (e.g. via spring, resiliently deformable material such as a rubber piece, etc.) of the corresponding aperture 34. In general, the locking pawls 62 are resiliently deformable away from the curved surfaces 36 of the apertures 34. As such, the locking pawls 62 are physically manipulatable (e.g. pivotable, deformable, etc.) away from the curved surfaces 36, as described in further detail below. In this fashion, the locking pawls 62 are configured to pinch the elongated straps 54 against the curved surfaces 36 or a feature thereof (e.g. a ridge or slot, not shown) when the elongated straps 54 are inserted into the apertures 34 from the top surface 24 of the body 22. Moreover, the teeth 66 of the locking pawls 62 are configured to mechanically engage the serrations 60 of the elongated straps 54 when the elongated straps 54 are so inserted to an extent where the serrations 60 are disposed adjacent the locking pawls 62 within the apertures 34.

As introduced above, each of the locking pawls 62 is releasably engagable with one of the elongated straps 54. In particular, each of the elongated straps 54 is insertable within the aperture 34 proximal the elongated strap 54 being inserted, with the locking pawl 62 within that proximal aperture 34 being adapted for engaging and retaining the elongated strap 54 within the apertures 34 (e.g. via the teeth 66 of the locking pawl 62 and the serrations 60 of the elongated strap 54 mechanically engaging each other). Moreover, when the elongated strap 54 is so inserted into the aperture 34 and retained therein via the locking pawl 62, the locking pawl 62 is disengagable from the elongated strap 54, e.g. for releasing the elongated strap 54 from the aperture 34 (i.e., allowing for the elongated strap 54 to be removed (e.g. pulled) from the aperture 34). As such, when the elongated strap 54 is disposed and retained within the aperture 34, releasing the elongated strap 54 from the aperture 34 typically comprises manipulating the locking pawl 62 away from the curved surface 36. Likewise, releasing the elongated strap 54 from the aperture 34 may comprise disengaging the teeth 66 of the locking pawl 62 from the serrations 60 of the elongated strap 54.

While disposed within the aperture 34, the locking pawl 62 is generally adapted to be manipulated, and thus released from engagement with the elongated straps 54 when engaged as described above, via a tool and/or by hand. In particular, as introduced above, the openings 40 defined by the body 22 extend internally from the side surfaces 32 to the apertures 34. More particularly, the body 22 defines at least one opening 40 extending to a portion of the apertures 34 adjacent the locking pawls 62, such that each locking pawl 62 is accessible from the side surface 32 of the body 22 via at least one of the openings 40. As such, manipulating the locking pawl 62 to release the elongated strap 54 from the aperture 34 may be performed by hand and/or with a tool via the openings 40. To facilitate manipulating the locking pawl 62 (and releasing the elongated strap 54 from engagement therewith), the locking pawl 62 may comprise one or more engagement points 68 adjacent the opening 40. As shown generally in FIG. 6, the engagement points 68 may comprise, or be defined as, protrusions (e.g. a tab, ridge, rail, etc.) 68 extending from the locking pawls 62 in a direction substantially perpendicular to the path of travel of the locking pawls 62. Alternatively, or in addition, the engagement points 68 may comprise slots (not shown) defined by the locking pawls 62. As will be appreciated by those of skill in the art, the engagement points 68 comprising such protrusions and/or slots provide purchase, and thus increased leverage and/or ease of force application, for a tool and/or hand (e.g. a finger) being utilized in manipulating the locking pawls 62 (e.g. when releasing the elongated straps 54 from being retained within the apertures 34. Accordingly, the engagement points 68 are not generally limited, and may comprise any shape, dimension, texture, etc. suitable for increasing engagement of the locking pawls 62 with a tool and/or hand via the openings 40.

The various components, and elements of such components, of the releasable fastener 20 described above, e.g. the body 22, the elongated straps 54, and the locking pawls 62, may be manufactured of the same or different material(s), such as any one or more of the materials described below. For example, in some embodiments, the releasable fastener 20 is monolithic in construction and substantially homogeneous in composition. However, the releasable fastener 20 may comprise multiple components of varying compositions joined together. Moreover, each component may itself comprise a combination of different materials, and thus may not comprise a homogeneous composition throughout. In general, materials suitable for use in or as the releasable fastener 20 and/or the components thereof (e.g. the body 22, the elongated straps 54, the locking pawls 62, and the various portions thereof) include metals (e.g. steels, aluminums, alloys, etc.), resins (e.g. thermoset and/or thermoplastic resins), and combinations thereof. However, myriad materials may be used to manufacture the components and elements of the releasable fastener 20, with each typically being selected as a function of availability, cost, performance/end use applications, etc. As such, metals, metal alloys, resins are not exhaustive of suitable materials that may be used. Additionally, it is to be appreciated a surface or portion thereof of a particular component of the releasable fastener 20 may be coated, painted, and/or impregnated with a material having desired characteristics including, but not limited to, those described above and/or below. Moreover, one of skill in the art will readily appreciate that particular materials will be selected based on the features and/or functions of the releasable fastener 20 or particular components thereof (e.g. the flexibility and resiliency of the elongated straps 54, the resiliency and directional deformability of the locking pawls 62, etc.).

In various embodiments, the releasable fastener 20 comprises a resin. Examples of suitable resins typically comprise the reaction product of a monomer and a curing agent, although resins formed of self-polymerizing monomers (i.e., those acting as both a monomer and a curing agent) may also be utilized. It is to be appreciated that such resins are conventionally named/identified according to a particular functional group present in the reaction product. For example, the term "polyurethane resin" represents a polymeric compound comprising a reaction product of an isocyanate (i.e., a monomer) and a polyol (i.e., a chain extender/curing agent). The reaction of the isocyanate and the polyol create urethane functional groups, which were not present in either of the unreacted monomer or curing agent. However, it is also to be appreciated that, in certain instances, resins are named according to a particular functional group present in the monomer (i.e., a cure site). For example, the term "epoxy resin" represents a polymeric compound comprising a cross-linked reaction product of a monomer having one or more epoxide groups (i.e., an epoxide) and a curing agent. However, once cured, the epoxy resin is no longer an epoxy, or no longer includes epoxide groups, but for any unreacted or residual epoxide groups (i.e., cure sites), which may remain after curing, as understood in the art. In other instances, however, resins may be named according to a functional group present in both the monomer and the reaction product (i.e., an unreacted functional group).

In some embodiments, the resin is selected from thermoset resins and thermoplastic resins. Examples of suitable thermoset and/or thermoplastic resins typically include polyamides (PA), such as Nylons; polyesters such as polyethylene terephthalates (PET), polybutylene terephthalates (PET), polytrimethylene terephthalates (PTT), polyethylene naphthalates (PEN), liquid crystalline polyesters, and the like; polyolefins such as polyethylenes (PE), polypropylenes (PP), polybutylenes, and the like; styrenic resins; polyoxymethylenes (POM); polycarbonates (PC); polymethylenemethacrylates (PMMA); polyvinyl chlorides (PVC); polyphenylene sulfides (PPS); polyphenylene ethers (PPE); polyimides (PI); polyamideimides (PAI); polyetherimides (PEI); polysulfones (PSU); polyethersulfones; polyketones (PK); polyetherketones (PEK); polyetheretherketones (PEEK); polyetherketoneketones (PEKK); polyarylates (PAR); polyethernitriles (PEN); resol-type; urea (e.g. melamine-type); phenoxy resins; fluorinated resins, such as polytetrafluoroethylenes; thermoplastic elastomers, such as polystyrene types, polyolefin types, polyurethane types, polyester types, polyamide types, polybutadiene types, polyisoprene types, fluoro types, and the like; and copolymers, modifications, and combinations thereof.

As introduced above, the releasable fastener 20, as provided above, is adapted to be coupled (e.g. fastened) to a component 74. This process may be referred to as installation of the releasable fastener 20, and a method of so installing the releasable fastener 20 (i.e., the "installation method") is provided. In general, the installation method includes coupling the body 22 of the releasable fastener 20 to the component 74, thereby installing the releasable fastener 20 on the component 74.

The component 74 is not generally limited, and may be any structure on which elongate articles may be secured, as will be understood in view of the embodiments described herein. Typically, the component is a panel (e.g. of a building, console, instrument panel, fascia, board, dashboard etc.), stud, or other structure comprising a surface 76 adjacent which the bottom surface 26 of the body 22 of the releasable fastener 20 may be disposed. The surface 76 need not be continuous, but rather may be broken by a cavity, hole, slot, channel, or other such feature defined by the component 74. For example, in certain embodiments, the component comprises a cavity or hole 78, as shown generally in FIG. 5. In such embodiments, the cavity 78 may comprise threads or ridges 80 adapted to cooperatively engage the fastening portion 48 of the body 22 and/or an external fastener (e.g. the bolt-type fastener 52, as described above).

Typically, coupling the body 22 of the releasable fastener 20 to the component 74 typically comprises fastening the body 22 to the component 74. In particular embodiments, fastening the body 22 to the component 74 comprises retainably engaging the fastening portion 48 of the body 22 within the cavity 78 of the component 74 (e.g. via disposing the fastening portion 48 in the cavity 78, such as when the fastening portion 48 comprises a push-type fastener), as shown generally in FIG. 7. In these or other embodiments, coupling the body 22 of the releasable fastener 20 to the component 74 comprises disposing an external fastener (e.g. the bolt-type fastener 52) though the through hole 42 of the body 22 of the releasable fastener 20, and retainably engaging the external fastener within the cavity 78 of the component 74 (e.g. via threads 80 and/or another retaining element, such as a nut 82 or other fastening element), as shown generally in FIG. 5. As will be readily understood by those of skill in the art, the installation method prepares a fastener assembly (not shown) comprising the releasable fastener 20 coupled to (e.g. installed on) the component 74, which may be utilized in conjunction with, or separate from, other methods and assemblies disclosed herein. In particular embodiments, such a fastener assembly is provided comprising the releasable fastener 20 installed on a panel.

As also introduced above, the releasable fastener 20 is adapted for releasably coupling articles to the component 74. To this end, a method of releasably fastening an article to the component (i.e., the "fastening method") with the releasable fastener 20 is also provided. As will be appreciated in view of the embodiments described herein, the fastening method prepares an assembly, which is also provided and shown generally at 84 in FIG. 7. In particular, the assembly 84 comprises at least one elongate article 86 releasably secured to the releasable fastener 20, which is itself coupled to the component 74. Said differently, the assembly 84 comprises one (e.g. when the releasable fastener 20 comprises either the single or double tie-strap configuration), alternatively two (e.g. when the releasable fastener 20 comprises the double tie-strap configuration), elongate article(s) 86 releasably secured to the releasable fastener 20 of the fastener assembly described above.

In general, the fastening method comprises installing the releasable fastener 20 on the component 74 (e.g. via the installation method) and releasably securing the elongate article(s) 86 to the releasable fastener 20, thereby releasably fastening the elongate article(s) 86 to the component 74. However, it is to be appreciated that the releasable fastener 20 may be installed on the component 74 (e.g. via the installation method) before, during, or after securing the elongate article(s) 86 to the releasable fastener 20. As such, while the releasable fastener 20 provides increased ease of securing elongate articles to a component (e.g. a panel) on which the releasable fastener 20 has already been installed, one or two elongate articles may be secured to the releasable fastener 20 prior to installation of the releasable fastener 20 to the component.

As will be understood by those of skill in the art, the elongate article(s) 86 are not particularly limited, and are exemplified by wires, cables, hoses, tubes/tubing, pipes, conduit, etc. Likewise, a bundle of cables, wires, etc., whether loose bundled, sheathed, wrapped, etc. may also be utilized with the fastening method as described herein (i.e., as a single "elongate article", regardless of the number of individual articles in the bundle). Moreover, as the fastening method may comprise releasably securing one or two of the elongate articles 86 to the releasable fastener 20, reference to the "elongate article(s) 86" or the "elongate article 86" are to be understood to generally refer to any one or two of such articles utilized during the method, which may be the same or different from one another, may be utilized at the same or different times during the method, and may be utilized in accordance with the same or different embodiments as consistent with the description herein. Accordingly, in certain embodiments the method includes securing one elongate article 86 to the releasable fastener 20. In such embodiments, the releasable fastener 20 may comprise either the single or double tie-strap configuration. In other embodiments, the method includes securing two elongate articles 86 to the releasable fastener 20. In such embodiments, the releasable fastener 20 comprised the double tie-strap configuration, and the elongate article(s) 86 may be the same as or different from one another, e.g. with respect to type, shape, size (e.g. diameter), etc. Moreover, it is to be understood that the releasable fastener 20 may be dimensioned (e.g. with respect to the length of the elongated strap(s) 54) in proportion to the particular elongate article(s) 86 intended for use. For example, in certain embodiments, the releasable fastener 20 may comprise two elongated straps 54 (e.g. when comprising the double tie-strap configuration) each having different lengths from one another to accommodate securing two elongate articles 86 having different circumferences at the portions to be wrapped by the elongated straps 54. In such embodiments, while functioning in the same way described above, the elongated straps 54 may be defined as a first elongated strap 54 and a second elongated strap 54 for ease of reference, e.g. where the first elongated strap 54 is longer than the second elongated strap 54 (i.e., extends further away from the body 22, such that a larger elongate article can be accommodated), or where the second elongated strap 54 is longer than the first elongated strap 54.

Typically, releasably securing the elongate article 86 to the releasable fastener 20 comprises disposing the elongate article 86 and one of the lateral side surfaces 30 of the releasable fastener 20 adjacent one another, wrapping one of the elongated straps 54 of the releasable fastener 20 around an exterior surface 88 of the elongate article 86, and inserting the elongated strap 54 into the aperture 34 proximal the elongated strap 54 from the top surface 24 of the body 22. Said differently, the elongate article 86 is releasably secured to the releasable fastener 20 comprising the elongated strap 54 in the looped configuration described above, such that the step of releasably securing may comprise, or be defined as, looping the elongated strap 54 around a portion of the elongate article 86 (e.g. the exterior surface 88) and through the aperture 34 of the body 22. In this fashion, the fastening method further includes engaging the elongated strap 54 with the locking pawl 62 disposed in the aperture 34, thereby releasably retaining the elongated strap 54 in the aperture and lashing the elongate article 86 to the lateral side surface 30 of the releasable fastener 20 with the elongated strap 54.

It is to be appreciated that the elongated strap 54 of the releasable fastener 20 may be placed in the looped configuration before, during, or after disposing the elongate article 86 adjacent the lateral side surface 30 of the releasable fastener 20. For example, in certain embodiments, the fastening method includes placing the releasable fastener 20 in the looped configuration, disposing the loop formed by the elongated strap 54 about the elongate article 86, and then optionally tightening the elongated strap 54 about the elongate article 86 (i.e., inserting the elongated strap 54 further into/through the aperture 34 of the body 22, e.g. by pulling the terminal end 56 of the elongated strap 54 away from the body 22). In other embodiments, the fastening method comprises disposing the elongate article 86 adjacent the lateral side surface 30, and subsequently wrapping the elongated strap 54 about the elongate article 86 and inserting the terminal end 56 into and through the aperture 34 of the body 22 to lash the elongate article 86 to the body 22.

As described above, the releasable fastener 20 is adapted to releasable secure the elongate article(s) 86. More specifically, the features of the releasable fastener 20 set forth in the embodiments described above provide for conveniently releasing and/or adjusting the elongate article(s) 86 with respect to the releasable fastener 20 when installed on the component 74, without first uninstalling the releasable fastener 20 from the component 74. In particular, the opening (s) 40 defined by the body 22 of the releasable fastener 20 provide access to the locking pawl(s) 62, which are releasable from engagement with the elongated strap(s) 54 via manipulation (e.g. with a tool or by hand, at engagement point(s) 68), such as by pivoting/deforming the locking pawl(s) 62 away from the curved surface(s) 36 until the teeth 66 disengage from the serrations 60 of the elongated strap(s) 54. In general, loosening or unsecuring the elongate article (s) 86 from the releasable fastener 20 comprises removing the elongated strap(s) 54 from the apertures 34 (partially or fully, respectively) after disengaging the locking pawl(s) 62 from the elongated strap(s). As such, in certain embodiments, the fastening method further comprises disengaging one of the locking pawls 62 from the elongated strap 54 wrapped around the elongate article 86, thereby releasing the elongated strap 54 from the aperture 34 and unsecuring the elongate article 86 from the releasable fastener 20. In some such embodiments, disengaging the locking pawl 62 comprises pivoting the locking pawl 62 away from the elongated strap 54. In particular embodiments, the fastening method comprises unsecuring both elongate articles 86 from the releasable fastener 20 (e.g. when the releasable fastener 20 comprises the double tie-strap configuration). However, it is to be appreciated that the fastening method may include securing, unsecuring/releasing, and/or resecuring either, both, or any one of the elongate article(s) 86 secured to the releasable fastener 20 any number of times, as the design and features of the embodiments above provide the releasable fastener 20 with suitability for extended and/or repeated use to fasten the elongate article(s) 86 to the component 74.

The above description relates to general and specific embodiments of the disclosure. However, various alterations and changes can be made without departing from the spirit and broader aspects of the disclosure as defined in the appended claims, which are to be interpreted in accordance with the principles of patent law including the doctrine of equivalents. As such, this disclosure is presented for illustrative purposes and should not be interpreted as an exhaustive description of all embodiments of the disclosure or to limit the scope of the claims to the specific elements illustrated or described in connection with these embodiments. Any reference to elements in the singular, for example, using the articles "a," "an," "the," or "said," is not to be construed as limiting the element to the singular. Further, it is to be understood that the terms "right angle", "orthogonal", and "parallel" are generally employed herein in a relative and not an absolute sense.

Likewise, it is also to be understood that the appended claims are not limited to express and particular compounds, compositions, or methods described in the detailed description, which may vary between particular embodiments that fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

Further, any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The invention claimed is:

1. A releasable tie-strap fastener, comprising:
a body defining an aperture extending in an inwardly curved path from a lateral side of the body to a top surface of the body, and an opening extending internally from a side surface of the body to the aperture;
an elongated strap projecting laterally outward from the lateral side of the body between the top surface of the body and the aperture, the elongated strap adapted to be inserted into the aperture from the top surface of the body; and
a locking pawl disposed in the aperture of the body and adapted for releasably engaging and retaining the elongated strap when inserted therein from the top surface of the body;
wherein the locking pawl is pivotably accessible from the side surface of the body via the opening.

2. The releasable tie-strap fastener of claim 1, wherein the body comprises a bottom surface opposing the top surface, where the bottom surface is adapted to be disposed on a surface of a panel.

3. The releasable tie-strap fastener of claim 1, wherein: (i) the body comprises a fastening portion; (ii) the body is configured to be coupled to a panel; or (iii) both (i) and (ii).

4. The releasable tie-strap fastener of claim 1, wherein the body defines a through hole extending from the top surface to the bottom surface of the body, and wherein the through hole is adapted to receive a fastener.

5. The releasable tie-strap fastener of claim 1, wherein the opposing lateral side of the body comprises a concave surface between the elongated strap and the top surface of the body.

6. The releasable tie-strap fastener of claim 1, wherein the elongated strap includes a first surface comprising serrations, and wherein the locking pawl includes teeth engageable with the serrations of the elongated straps.

7. The releasable tie-strap fastener of claim 1, wherein the locking pawl comprises: (i) a tab; (ii) a slot; or (iii) both (i) and (ii); and wherein the tab (i) and/or slot (ii) is adapted to be engaged via the opening in the side surface of the body for pivoting the locking pawl away from an interior surface of the aperture.

8. The releasable tie-strap fastener of claim 1, wherein: (i) the body comprises a polymeric material; (ii) the elongated strap comprises a polymeric material; (iii) the locking pawl comprises a polymeric material; or (iv) a combination of (i)-(iii).

9. The releasable tie-strap fastener of claim 1, wherein: (i) the body and the elongated strap are integrally formed; (ii) the body and the locking pawl are integrally formed; or (iii) both (i) and (ii).

10. The releasable tie-strap fastener of claim 1, wherein the releasable tie-strap fastener is monolithic in construction.

11. A releasable tie-strap fastener, comprising:
a body defining a pair of laterally spaced apertures each extending in an inwardly curved path from opposing lateral sides of the body to a top surface of the body, and openings extending internally from a side surface of the body to each aperture;
a pair of elongated straps each projecting laterally outward from the opposing lateral sides of the body between the top surface of the body and the apertures, each elongated strap adapted to be inserted into the aperture proximal the elongated strap from the top surface of the body; and
a pair of locking pawls, each locking pawl disposed in one of the apertures of the body and adapted for releasably engaging and retaining one of the elongated straps when inserted therein from the top surface of the body;
wherein each locking pawl is pivotably accessible from the side surface of the body via the openings.

12. A method of installing a releasable tie-strap fastener on a panel, comprising:
providing a releasable tie-strap fastener, wherein the releasable tie-strap fastener is the releasable tie-strap fastener of claim 1; and
coupling the body of the releasable tie-strap fastener to the panel, thereby installing the releasable tie-strap fastener on the panel.

13. The method of claim 12, wherein coupling the body of the releasable tie-strap fastener to the panel comprises fastening the body of the releasable tie-strap fastener to the panel with a fastener, and wherein: (i) the fastener is a threaded fastener; (ii) the fastener is a push-type fastener; (iii) the fastener is integrally formed with the body; or (v) a combination of (i)-(iii).

14. A method of releasably fastening an elongate article to a panel, comprising:
installing a releasable tie-strap fastener on the panel in accordance with the method of claim 12; and
releasably securing an elongate article to the releasable tie-strap fastener, thereby releasably fastening the elongate article to the panel.

15. The method of claim 14, wherein securing the elongate article to the tie-strap fastener comprises wrapping one elongated strap of the releasable tie-strap fastener around the elongate article and inserting the elongated strap into the aperture proximal the elongated strap from the top surface of the body, and engaging the elongated strap with the locking pawl disposed in the aperture to releasably retain the elongated strap in the aperture; and wherein the method further comprises unsecuring the elongate article from the releasable tie-strap fastener via disengaging the locking pawl from the elongated strap by pivoting the locking pawl away from the elongated strap until the locking pawl no longer retains the elongated strap within the aperture.

* * * * *